Dec. 22, 1931.   J. W. TATTER   1,837,239
PACKING DEVICE
Filed Nov. 5, 1928   2 Sheets-Sheet 1
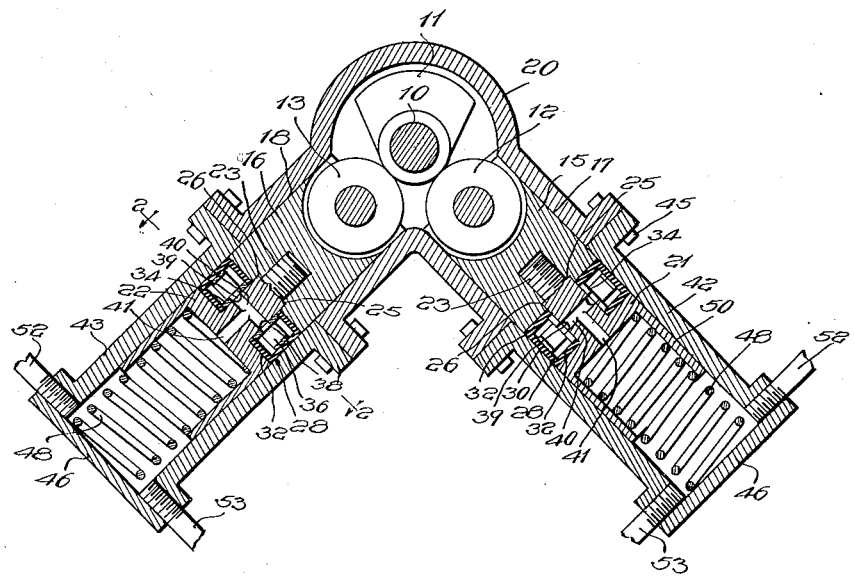
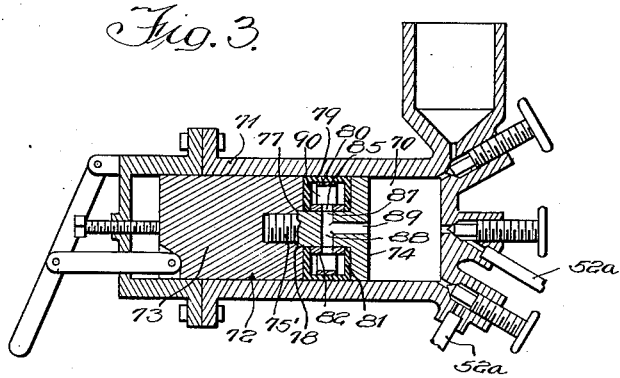
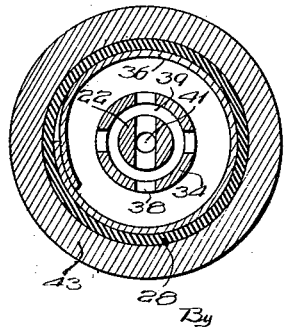
Witness:
William P. Kilroy
Inventor:
John W. Tatter
By Hill & Hill
Attys Dec. 22, 1931.  J. W. TATTER  1,837,239
PACKING DEVICE
Filed Nov. 5, 1928  2 Sheets-Sheet 2

Witness:
William P. Kilroy

Inventor
John W. Tatter
Hill & Hill
Attys

Patented Dec. 22, 1931

1,837,239

UNITED STATES PATENT OFFICE

JOHN W. TATTER, OF CHICAGO, ILLINOIS, ASSIGNOR TO LEWIS DIFFERENTIAL COMPANY, OF CHICAGO, ILLINOIS, A CORPORATION OF ILLINOIS

PACKING DEVICE

Application filed November 5, 1928. Serial No. 317,331.

My invention relates to packing devices and has among its other objects the production of the kind described which are convenient, durable, efficient and satisfactory for use wherever found applicable.

A particular object of the invention is to provide improved means to prevent leakage of fluid from braking apparatus of the hydraulic type.

Another particular object of the invention is to provide improved packing means to prevent leakage of fluid past a piston which is slidably journaled in a cylinder.

Apparatus embodying one form of the invention comprises a piston slidably journaled in a cylinder, the piston having one of my improved packing devices made of elastic material secured thereto. The improved packing device, in this instance, comprises an annular member having a cylindrical wall engageable with the interior wall of the cylinder and adapted to prevent leakage of fluid through the clearance space between the piston and cylinder. The piston is constructed so that the interior surfaces of the packing member may be subjected to fluid pressure to expand the packing member against the interior wall of the cylinder.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a section taken through brake operating mechanism which is of the hydraulic type and embodies my invention;

Fig. 2 is an enlarged section taken on line 2—2 of Fig. 1;

Fig. 3 is a section taken through a regulating and filling device which embodies my invention and is adapted to be used in connection with braking apparatus of the hydraulic type;

Fig. 4 is a section taken through a brake which embodies my invention and is adapted to be employed upon an automobile, or the like.

Figure 4:
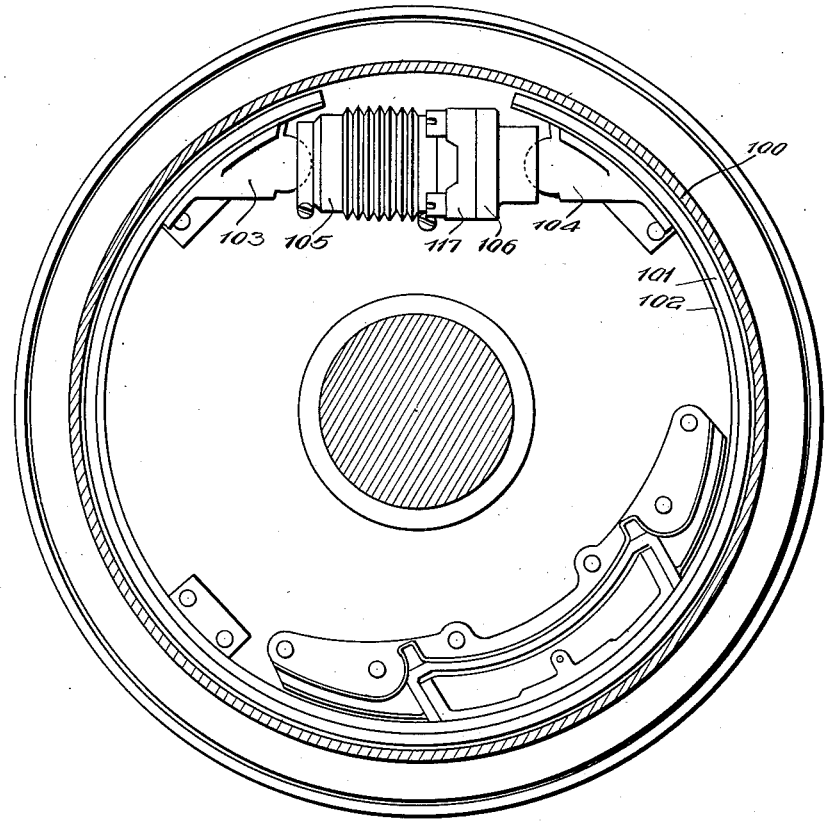

Referring for the present to Figs. 1 and 2, I have disclosed my invention embodied in apparatus forming part of hydraulically operated brake apparatus but it is to be understood that my invention is limited to such use only to the extent indicated in the appended claims. Only a relatively small portion of the brake apparatus is shown in Figs. 1 and 2 and in the other figures of the drawings. In Fig. 1 the reference character 10 designates the steering column shaft of a tractor which is equipped with hydraulically operated brakes. A cam 11 rigidly secured to the shaft 10 co-operates with rollers 12 and 13 which are carried by piston members 15 and 16, respectively, the piston members 15 and 16 being slidably journaled in cylinder chambers 17 and 18, respectively, that are formed in a bracket 20 which forms part of the steering column. Secured to the outer ends of the piston members 15 and 16 are piston members 21 and 22, respectively, the piston members 21 and 22 being provided with reduced portions or projections 23 which are screw-threaded into the piston members 15 and 16. As shown, each reduced portion 23 is provided with an annular shoulder 25 adapted to engage an annular shoulder 26 provided in the cooperating piston members 15 and 16, the construction being such that the shoulders 25 and 26 hold the larger portion of the piston 21 in spaced relation with respect to the piston 15 and also hold the larger portion of the piston member 22 in spaced relation with respect to the piston member 16 so that improved packing members 28 may be positioned between each pair of piston members and compressed a predetermined amount. Each of the packing members 28 is preferably formed from rubber, or the equivalent, and preferably comprises an annular cylindrical wall 30 having two inwardly extending flanges 32 formed integral therewith. Disposed around each projection 23 is a collar or sleeve 34 which is interposed between the ends of the associated annular flanges 32, the construction being such that the flanges may be clamped between the sleeve or collar 34 and the associated piston members. Disposed within each packing member 28 and engageable with the inner surface of the cylindrical wall 30 thereof is a spring member 36 which prevents the packing member from collapsing when a partial vacuum obtains therein. The collar or sleeve 34 is preferably provided with apertures 38 which register with an annular groove 39 formed in the associated member 23 and the groove 39 communicates with a transverse bore 40 formed in the member 23, which bore 40 communicates, in turn, with a bore 41. The bore 41 communicates with the outer end of the piston member in which it is formed.

It will be noted that the cylinder chambers 17 and 18 extend into cylinders 42 and 43, respectively, which are secured by bolts 45 to the bracket member 20. The outer ends of the cylinders 42 and 43 are closed by end walls 46 and interposed between the end walls 46 and the piston members 21 and 22 are compression springs 48, the function of the springs 48 being to hold the rollers 12 and 13 in engagement with the cam 11. In this instance, the piston members 21 and 22 have relatively large depressions 50 in their outer ends which accommodate the compression springs 48. These depressions 50 together with the space between the pistons 21 and 22 and the end walls 46 of the cylinders 42 and 43 forming reservoirs for the fluid whereby the brake mechanism is operated. As shown, the outer end of each cylinder 42 and 43 communicates with a pair of pipes 52 and 53. Fluid may be forced out of the above-mentioned reservoirs through the pipes 53 when the cam 11 displaces the rollers 12 and 13 against the action of the springs 48. The pipe 53 associated with the cylinder 42 communicates with the brake associated with one side of the tractor and the pipe 53 associated with the cylinder 43 communicates with the brake associated with the other side of the tractor, the arrangement being such that when the shaft 10 is rotated to steer the tractor in a desired direction, the cam 11 will displace one of the rollers 13 or 12 to displace the piston members associated therewith so that they will create a pressure in the proper pipe 53 to operate the brake upon that side of the vehicle which is on the inner side of the turn. The pipes 52 connect the cylinders 42 and 43 with a filling and regulating device hereinafter described. It will be noted that the above-mentioned reservoirs formed in the ends of the cylinders 42 and 43 communicate through the bores 41 and 40 and the apertures 38 with the interiors of the packing members 28 so that when pressure is produced within the reservoirs due to displacement of the piston members associated therewith, the interior surface of the packing members are subjected to the fluid pressures and the cylinder walls 30 of the packing members will be urged against the interior surfaces of the cylinders 42 and 43 to prevent leakage of fluid from the reservoirs past the piston members.

As set forth above, the function of the springs 36 is to prevent collapse of the packing members 28 when partial vacuums are developed therein. Thus, when the brake system is to be filled with suitable liquid, a partial vacuum is first produced therein after which the liquid is introduced therein.

In Fig. 3 I have shown my invention embodied in a filling and regulating device which is similar to one shown in my copending application Serial No. 306,599 filed Sept. 27, 1928. The regulating and filling device may form part of the same system as the apparatus shown in Figs. 1 and 2 and the cylinders 42 and 43 may be connected thereto. The pipes 52 may be connected to the filling and regulating device by connecting them to the pipes 52a which communicate with a chamber 70 formed in a cylinder 71. Journaled in the chamber 70 is a piston 72 which comprises a piston member 73 and a piston member 74, the piston member 74 being provided with a reduced portion 75 screw-threaded into the piston member 73. An annular shoulder 77 formed upon the reduced portion 75 cooperates with an annular shoulder 78 formed in the piston member 73 to limit the distance the reduced portion 75 may be screw-threaded into the piston member 73. Disposed around the reduced portion 75 and interposed between the piston member 73 and the larger portion of the piston member 74 is a packing member 79 which is preferably formed of rubber, or the equivalent, and is preferably substantially identical in form to the above described packing members 28. Thus, it will be noted that the packing member 79 comprises an annular wall 80 having two inwardly extending annular flanges 81 formed integral therewith. Interposed between the annular flanges 81 is a sleeve or collar 82 which has the same function as the collar or sleeve 34. Apertures 85 formed in the sleeve or collar 82 communicate with an annular groove 87 formed in the reduced portion 75 and the annular groove 87 communicates through bores 88 and 89 with the chamber 70. A spring 90 disposed within the packing member 79 is preferably substantially identical in construction to the spring 36 and has the same function.

Obviously, when the chamber 70 is filled with liquid and the piston 72 is displaced to the right (Fig. 3), the pressure developed in the chamber acts through the bores 88 and 89 and through the apertures 85 to urge the cylindrical wall 80 of the packing member 79 against the interior wall of the cylinder 71. This prevents leakage of the fluid from the chamber 70 by way of the clearance space between the cylinder members 73 and 74 and the interior surface of the cylinder 71.

Figure 5:
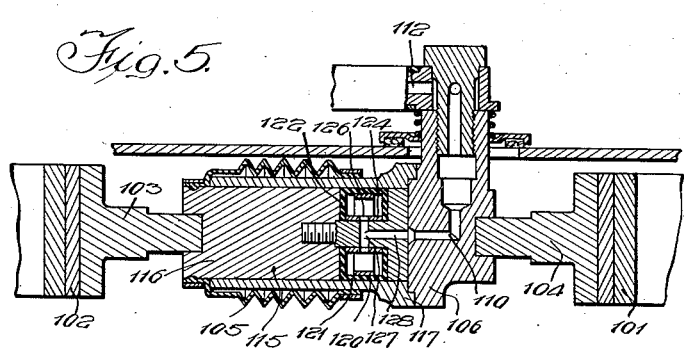
Fig. 5 is an enlarged section taken on line 5—5 of Fig. 4.

Referring to Figs. 4 and 5 wherein I have shown my invention embodied in a brake adapted to be used in connection with the apparatus shown in Figs. 1 to 3, inclusive, the reference character 100 designates a brake drum which is engageable by a brake lining 101 carried by a brake band 102. Secured to the ends of the brake band 102 are bracket members 103 and 104 and interposed between the brackets 103 and 104 is a cylinder 105 and a bracket member 106, the cylinder 105 being rigidly secured to the bracket member 106. This construction is similar to the construction shown and described in my copending application Serial No. 306,599 filed Sept. 27, 1928. The bracket member 106 is provided with a port 110 which communicates with the interior of the cylinder 105 and also communicates with a flexible tube 112, the tube 112 being adapted to be connected to any suitable source of fluid under pressure such as, for instance, one of the pipes 53 shown in Fig. 1. Disposed within the cylinder 105 is a piston 115 comprising piston members 116 and 117 which are screw-threaded to each other in substantially the same manner as the piston member 21 is screw-threaded to the piston member 15. Interposed between the piston members 116 and 117 is a packing member 120 which is substantially identical in construction with the packing members 28 and 79 described above, the packing member 120 being preferably made of rubber, or the equivalent. The packing member 120 comprises a cylindrical wall 121 having two inwardly extending flanges 122 formed integral therewith and interposed between the inner ends of the flanges 122 is a sleeve or collar 124 which has the same function as the aforementioned sleeves or collars 34 and 82, the sleeve or collar 124 being provided with apertures 126 which communicate through bores 127 and 128 with the interior of the cylinder 105. It is obvious that when fluid under pressure is forced into the cylinder 105 through the bore 110 in the bracket 106, the piston 116 will be displaced with respect to the bracket 106 to expand the brake band 102 and bring the brake lining 101 into engagement with the brake drum 100. At the same time the fluid pressure will act against the inner surface of the cylindrical wall 121 of the packing member 120 and force it against the interior surface of the cylinder 105 to prevent leakage of the fluid from the cylinder.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. The combination with a piston comprising a plurality of members rigidly connected in fixed relation with respect to each other, of a packing device formed of rubber and comprising a cylindrical wall and inwardly extending flanges formed integral with said wall, means for clamping said flanges against the respective piston members, and a spring for preventing said cylindrical wall from collapsing.

2. The combination with a piston comprising a plurality of members, of a packing device formed of elastic material and comprising a cylindrical wall and inwardly extending flanges formed integral with said wall, a collar, means for securing said piston members together and clamping said flanges between said collar and the respective piston members, and resilient means for preventing said cylindrical wall from collapsing.

3. The combination with a piston comprising a plurality of members, of a packing device formed of elastic material interposed between said members and comprising a cylindrical wall and inwardly extending flanges formed integral with said wall, a collar positioned between said flanges, means for securing said piston members together and clamping said flanges between said collar and the respective piston members, and resilient means positioned between said wall and collar for preventing the cylindrical wall from collapsing.

In testimony whereof, I have hereunto signed my name.

JOHN W. TATTER.